Jan. 21, 1958      J. A. McDOUGAL      2,820,957
INDICATORS OF CONDITIONS REQUIRING PRECEDENCE
Filed Aug. 18, 1955
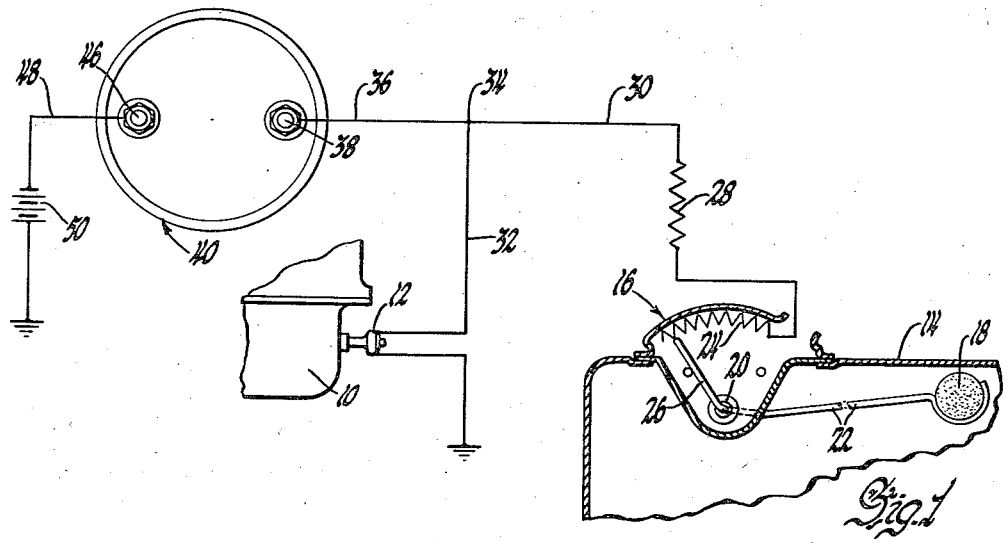
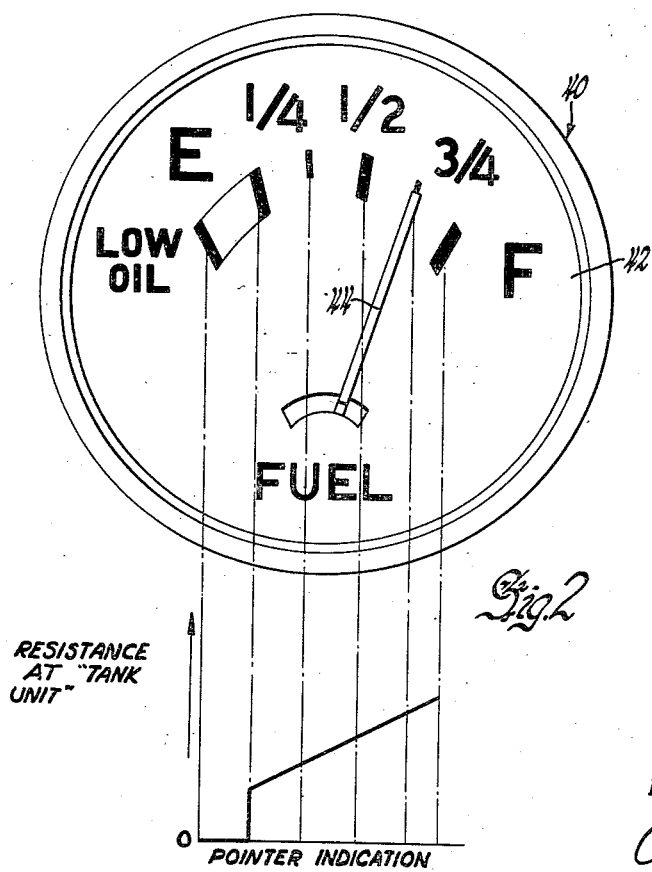
INVENTOR.
John A. McDougal
BY
J. W. Lovett
ATTORNEY

United States Patent Office 2,820,957
Patented Jan. 21, 1958

2,820,957

INDICATORS OF CONDITIONS REQUIRING PRECEDENCE

John A. McDougal, Flint, Mich., assignor to General Motors Corporation, Detroit, Mich., a corporation of Delaware Application August 18, 1955, Serial No. 529,296

3 Claims. (Cl. 340—220)

This invention relates to indicators for informing operators of either of two conditions which should hold priority over the other in a given system and more particularly to systems each employing an indicator capable of showing a subnormal condition of primary significance such as abnormal oil pressure in an internal combustion engine and at other times normally indicating the quantity of fuel in the supply tank.

In the operation of an automobile, for example, an operator is normally interested in the amount or supply of fuel or gasoline in his tank. He is also continually interested in the amount or pressure of the lubricating oil in his engine. Normally, however, the fuel supply is of primary importance and subject to the most fluctuation and an indicator showing such supply is mounted in a location most convenient for the operator to observe. Other conditions affecting automotive mechanical devices often momentarily and emphatically become of primary importance or significance, however, and displace the fuel supply as a major interest. One of these, for example, is the engine lubricating oil supply and/or pressure. The fuel supply would generally be of secondary significance in the subnormal event that the engine oil pressure should become abnormal or, more specifically, fall below that required for engine operation. If the fuel supply is low, the oil pressure condition may still be of primary importance if damage to the engine is to be avoided. Obviously, there is much advantage if the same conveniently located instrument or pointer normally indicating the supply of fuel would also serve to indicate a subnormal condition such as an undue drop in the oil pressure.

It is an object of the present invention to provide an automatic system employing a single indicator normally operative in accordance with one condition and subnormally operative in accordance with another condition of momentary and primary significance.

Another object is to provide a system employing a single electrically actuated pointer for normally informing an operator of a condition such as the supply of fuel available in a tank and also automatically informing him, when the occasion demands, of an undesirable or dangerous condition such as a failure or undue drop in the engine oil pressure.

A feature of the invention resides in a system having a pressure-actuated switch and a variable resistance connected in parallel circuits to ground. These parallel circuits may alternately complete the energizing system for the single indicator. The switch operation depends upon one condition and the extent of variable resistance in the parallel circuit is in accordance with a second condition. Another feature resides in a system employing a pressure operated switch and a variable resistance device connected in alternate parallel circuits and completing an energizing system for a single indicator, the switch being normally open but effective when closed automatically to cause the indicator to inform an operator of a subnormal condition.

These and other important features of the invention will now be described in detail in the specification and then pointed out more particularly in the appended claims.

In the drawings:

Fig. 1 is a diagrammatic representation of a system comprising an indicating instrument, a pressure-operated switch as installed on an engine, and a fuel measuring device as installed on the gasoline tank, these elements being connected in an electrical circuit as an embodiment of the present invention; and Fig. 2 is an enlarged and front view of the dial and pointer utilized on the instrument shown in Fig. 1 and a graphic representation of the circuit resistance in concurrence with the indicia on the dial.

In the diagrammatic representation, as shown in Fig. 1, a portion of a crankcase 10 of an engine is shown and to this case is connected a pressure-actuated switch 12. It will be understood that this switch is subjected to the pressure of the lubricating oil as the latter is forced by a conventional lubricating oil pump to the vital areas of the engine. A suitable pressure actuated switch of this type is shown in the United States Patent 2,698,887, granted January 4, 1955, in the name of George B. Shaw and entitled "Oil Pressure Switch." As in the patent, the switch 12 is normally held open by oil pressure and upon reduction in the pressure, the switch closes its contacts and establishes a circuit by action of a spring. Obviously, many forms of switches could be utilized for this purpose.

Fig. 1 also depicts a gasoline tank 14 in which is installed a float actuated device generally indicated at 16. This device includes a float 18 which is supported on an arm 22 mounted on the pivot 20 and adapted to rest on the surface of the fuel in the tank 14. The device 16 includes a resistance coil 24 which is insulated from the tank 14 but in contact with the end of an arm 26 which is an extension of the arm 22. The resistance 24 is connected in series with a fixed resistance 28. Current passing from connection 34 through the line 30 and the resistances 28 and 24 in series will be grounded to the tank at the pivot 20. A fluctuation in the fuel supply will cause a variation in the effective resistance of the coil 24 and will vary the amount of current passing through the line 30 and thus through the gauge connected thereto to indicate changes in fuel level. Fuel measuring devices of this nature as mounted on the tank are disclosed in the United States Letters Patent 1,902,933, granted March 28, 1933, in the name of Joseph Zubaty and 2,266,298, granted December 16, 1941, in the name of E. F. Bacon.

The switch 12, above referred to, is connected to ground and in parallel with the series resistance circuit just described by a line 32. The lines 30 and 32 are connected together at 34 into a common line 36 connected to a terminal 38 of a fuel gauge 40. This fuel gauge may be of any type having a dial 42 with a pointer 44 actuated by the current passing through the gauge. A gauge of this type is disclosed in the United States Letters Patent 2,229,392, granted January 21, 1941, in the name of Bruce H. Schwarze. The gauge is provided with a second terminal 46 connected by a line 48 to a battery 50 and then to ground.

In fuel gauges of the type above referred to, the pointer 44 is actuated to read empty or full, dependent upon the supply of fuel in the tank 14. As the float 18 is lowered because of a very low supply of fuel, then the effective value of resistance 24 in the circuit is reduced and more current flows. With minimum effective current flowing, the pointer 44 will register full or "F." When the tank 14 is empty, maximum current will be flowing through the line 30 and the pointer 44 will indicate that the tank is empty or be at "E."

In the present arrangement and regardless of the amount of fuel in the tank 14, if the oil pressure in the engine is adequate, then the switch 12 is held open by the oil pressure, the circuit 32 is electrically open and normal reading of the fuel gauge 40 is possible. In the event, however, that the oil pressure should drop for any reason, the switch 12 will close and the line 36 or terminal 38 will be connected directly to ground. This reduces the resistance from terminal 38 to ground to substantially zero and a large current flows through the gauge. This will move the pointer 44 further to the left than under empty tank conditions. The dial 42 is provided with symbols so that with the maximum amount of current passing through the gauge 40, the pointer 44 will swing to the left, as viewed in Fig. 2, to register with the symbol "Low Oil."

If all current is cut off such as would occur with the opening of an ignition switch (not shown) connected in series with the gauge 40, then the pointer 44 will swing to the right and away from the symbols of the dial 42. If desired, a shield may be provided concealing the pointer in such an off scale circumstance.

From the above, it may be seen that a single instrument is provided which is so utilized in a system as to be capable of giving either of two readings dependent upon which reading is of primary significance and that the system is subject to variations in circuitry without loss of advantages in simplicity and reliability.

I claim:

1. A system including an instrument for indicating either of two conditions requiring precedence, an electrical circuit arranged to actuate said instrument, a normally open switch in said circuit and connected to ground, said switch being biased to close and automatically subject to one of said conditions to be closed under subnormal conditions in said system, a device connected in parallel with said switch and having a resistance automatically variable in accordance with the other of said conditions, and the arrangement being such that said instrument normally operates in accordance with the said other condition and subnormally in accordance with the said one condition.

2. A system including an instrument for indicating a condition requiring precedence, said instrument having a graduated scale and being operative in accordance with an electrical current passing therethrough, a circuit arranged to carry said current and actuate said instrument, a switch in said system for by-passing a resistance to current passing through said instrument, said switch being automatically subject to one condition, a device connected in parallel with said switch and having a resistance automatically variable in accordance with another condition, and said instrument being actuable in extent to conform with the current passing therethrough.

3. An automatic system including an indicating instrument comprising an electrically operated gauge including a dial and pointer, a source of electrical power connected thereto, parallel electrical circuits connected to said gauge and completing the energizing system therefor, a switch in one of the said parallel circuits and automatically controlled by a first condition to be indicated by said pointer over a given field of said dial, and variable resistance means in another of said parallel circuits the resistance value of which automatically varies dependent upon a second condition which said pointer may indicate over an extension of said field.

References Cited in the file of this patent

UNITED STATES PATENTS

| | | |
|---|---|---|
| 1,175,417 | Fehrenbach | Mar. 14, 1916 |
| 1,786,566 | Hastings | Dec. 30, 1930 |
| 2,040,195 | Anderson | May 12, 1936 |